United States Patent
Liu

(10) Patent No.: US 8,295,339 B2
(45) Date of Patent: Oct. 23, 2012

(54) METHOD OF ESTIMATING INTER-CARRIER INTERFERENCE (ICI) AND ICI MITIGATING EQUALIZER

(75) Inventor: Guanghui Liu, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 998 days.

(21) Appl. No.: 12/193,075

(22) Filed: Aug. 18, 2008

(65) Prior Publication Data

US 2009/0060016 A1    Mar. 5, 2009

(30) Foreign Application Priority Data

Aug. 27, 2007   (KR) .................. 10-2007-0086278

(51) Int. Cl.
  *H03H 7/30*   (2006.01)
(52) U.S. Cl. ........ 375/229; 375/230; 375/231; 375/232; 375/260; 375/267; 375/346; 375/348; 375/350
(58) Field of Classification Search .................. 375/229, 375/232, 260, 262, 267, 342, 346, 348, 349, 375/350
See application file for complete search history.

(56) References Cited

U.S. PATENT DOCUMENTS

| | | | |
|---|---|---|---|
| 7,120,209 B2 | 10/2006 | Gorokhov et al. | |
| 2004/0005010 A1* | 1/2004 | He et al. | 375/260 |
| 2006/0239367 A1 | 10/2006 | Wilhelmsson et al. | |
| 2006/0251198 A1* | 11/2006 | Ma et al. | 375/350 |

FOREIGN PATENT DOCUMENTS

| | | |
|---|---|---|
| CN | 1514555 | 7/2004 |
| CN | 1635724 | 7/2005 |
| JP | 2005-150839 | 6/2005 |

* cited by examiner

*Primary Examiner* — David Ometz
*Assistant Examiner* — Eboni Hughes
(74) *Attorney, Agent, or Firm* — F. Chau & Associates, LLC

(57) ABSTRACT

An inter-carrier interference (ICI) mitigating equalizer includes a channel estimator, a channel calculator, an ICI estimator, a subtracter, and an equalizer. The channel estimator estimates a channel response from a received signal, and the channel calculator calculates a basic component of a channel response and fluctuating components of the channel response from the estimated channel response. The ICI estimator multiplies the fluctuating components of the channel response by a received signal in a frequency domain, filters the multiplication results according to filter coefficients, and estimates an ICI component included in the received signal based on the filtering results. The subtracter subtracts the ICI component from the received signal in the frequency domain. The equalizer equalizes an output signal of the subtracter based on the basic component of the channel response.

24 Claims, 9 Drawing Sheets

METHOD OF ESTIMATING INTER-CARRIER INTERFERENCE (ICI) AND ICI MITIGATING EQUALIZER

CROSS-REFERENCE TO RELATED PATENT APPLICATION

This application claims the benefit of Korean Patent Application No. 10-2007-0086278, filed on Aug. 27, 2007, in the Korean Intellectual Property Office, the disclosure of which is incorporated herein in its entirety by reference.

BACKGROUND OF THE INVENTION

1. Technical Field

The present disclosure relates to a method of estimating inter-carrier interference (ICI) and an ICI mitigating equalizer and, more particularly, to a method of estimating an ICI component by approximating a channel to an (M1)-th order model and an ICI mitigating equalizer.

2. Discussion of Related Art

Orthogonal frequency division multiplexing (OFDM) systems are applied to various broadcasting/communication systems. An OFDM system serves to transmit data by using a plurality of sub-carriers that are orthogonal to one another.

FIG. 1 illustrates examples of an OFDM transmitter 110 and an OFDM receiver 120 in an OFDM system.

Referring to FIG. 1, the OFDM transmitter 110 includes an encoder 11, a mapper 112, an inverse fast Fourier transform (IFFT) block 113, a cyclic prefix (CP) insertion unit 114, a radio frequency (RF) transmitter 115, and a transmitting antenna 116. The OFDM receiver 120 includes a receiving antenna 121, an RF receiver 122, a CP remover 123, a fast Fourier transform (FFT) block 124 an equalizer 125, a demapper 126, and a decoder 127.

In the OFDM transmitter 110, a cyclic prefix (CP) is inserted into a transmitted signal that is transformed through IFFT so as to prevent inter-symbol interference (ISI) and to estimate a channel. The transmitted signal $S_i(n)$ into which the CP is inserted is output to a wired/wireless channel via the RF transmitter 115 and the transmitting antenna 116. In the OFDM receiver 120, a received signal $r_i(n)$ from which the CP is removed is transformed into a received signal $R_i(k)$ in a frequency domain by using the FFT block 124. The equalizer 125 outputs a transmitting signal $\hat{S}_i(k)$ estimated by equalizing the received signal $R_i(k)$ in the frequency domain.

In order to accurately estimate the transmitted signal by using the OFDM receiver 120, a response characteristic of a channel has to be accurately recognized. The response characteristic of the channel may be changed according to time, however due to time-selectivity. The response characteristic of the channel may be changed according to frequency due to frequency-selectivity. Accordingly, it is difficult to accurately recognize the response characteristic of the channel. On the other hand, the time-selectivity and the frequency-selectivity of a channel damages orthogonality among sub-carriers and causes inter-carrier interference (ICI). Although the response characteristic of the channel may be accurately recognized by using pilots included in the CP, it may be inaccurate to estimate the transmitted signal due to an influence of the ICI.

The ICI increases the complexity of the accurate estimation of the transmitted signal by using the OFDM receiver 120. In order to allow the OFDM receiver 120 to accurately estimate the transmitted signal, the ICI component included in the received signal is initially estimated, and the ICI component included in the received signal has to be removed or mitigated based on the estimation result. Because a calculation amount and computational complexity increase in order to remove or mitigate the ICI component included in the received signal, the structure of the OFDM receiver 120 becomes complex. The OFDM receiver 120 is designed in consideration of a trade-off relation between accuracy of estimation and computational complexity.

SUMMARY OF THE INVENTION

Exemplary embodiments of the present invention provide a method of estimating an inter-carrier interference (ICI) component by approximating a channel to an (M1)-th order model. Exemplary embodiments of the present invention also provide an ICI mitigating equalizer for removing or mitigating an ICI component that is estimated by using the method of estimating the ICI component.

According to an exemplary embodiment of the present invention, there is provided an inter-carrier interference (ICI) mitigating equalizer comprising a channel estimator, a channel calculator, an ICI estimator, a subtracter, and an equalizer. The channel estimator estimates a channel response from a received signal. The channel calculator calculates a basic component and fluctuating components of a channel response from the estimated channel response. The ICI estimator multiplies the fluctuating components of the channel response by a received signal in a frequency domain, filters the multiplication results according to filter coefficients, and estimates an ICI component included in the received signal based on the filtering results. The subtracter subtracts the ICI component from the received signal in the frequency domain. The equalizer equalizes an output signal of the subtracter based on the basic component of the channel response.

In an exemplary embodiment of the present invention, the basic component of the channel response may be channel response component that is time-invariant for one symbol interval, and the fluctuating components of the channel response may be a channel response components that are time-variant for one symbol interval. In addition, in a case where a channel is approximated to an (M1)-th order model, the channel calculator may output first order to (M1)-th order fluctuating components of the channel response to the ICI estimator.

In addition, the ICI estimator may include: a multiplication unit multiplying the fluctuating components of the channel response by the received signal in the frequency domain and outputting the multiplication results; a filter bank filtering the multiplication result according to the filter coefficients and outputting the filtering results; and an adder adding up the filtering result and outputting the ICI component.

In addition, in a case where a channel is approximated to an (M1)-th order model, the multiplication unit may include first to (M1)-th multipliers that respectively multiply first order to (M1)-th order fluctuating components of the channel response that are respectively output from the channel calculator by the received signal in the frequency domain to output the first to (M1)-th multiplication results.

In addition, in a case where a channel is approximated to an (M1)-th order model, the filter bank may include first to (M1)-th filters that respectively filter the first to (M1)-th multiplication results that are respectively output from the first to (M1)-th multipliers of the multiplication unit according to first to (M1)-th filter coefficients to output the first to (M1)-th filtering results. In addition, the first to (M1)-th filters may be linear, time-invariant filters. In addition, the first to (M1)-th filters may be finite impulse response (FIR) filters.

In addition, the equalizer may be embodied as a one-tap equalizer.

Furthermore, the aforementioned ICI mitigating equalizer may be applied to a receiver of an orthogonal frequency division multiplexing (OFDM) system.

According to an exemplary embodiment of the present invention, there is provided a method of estimating the ICI, the method comprising: calculating first order to (M1)-th order fluctuating components of a channel response from a channel response that is estimated from a received signal; multiplying each of the first order to (M1)-th order fluctuating components of the channel response by a received signal in a frequency domain and outputting first to (M1)-th multiplication results; filtering the first to (M1)-th multiplication results respectively according to first to (M1)-th filter coefficients and outputting first to (M1)-th filtering results; and estimating an ICI component included in the received signal by adding up the first to (M1)-th filtering results.

In an exemplary embodiment of the present invention, in a case where a channel is approximated to an (M1)-th order model, the channel response that is estimated from the received signal may be divided into a basic component that is time-invariant for one symbol interval and the first order to (M1)-th order fluctuating components that are time-variant for one symbol interval.

According to an exemplary embodiment of the present invention, there is provided an ICI mitigating equalizer comprising: a channel estimator estimating a channel response from a received signal; a channel calculator calculating a basic component and a first order fluctuating component of a channel response from the estimated channel response; a first multiplier multiplying the first order fluctuating component of the channel response by a received signal in a frequency domain and outputting a first multiplication result; a first filter FIR-filtering the first multiplication result according to first filter coefficients and outputting an ICI component included in the received signal; a subtracter subtracting the ICI component from the received signal in the frequency domain; and an equalizer equalizing an output signal of the subtracter according to the basic component of the channel response.

In an exemplary embodiment of the present invention, the channel calculator may approximate a channel to a first order linear model. In addition, the channel calculator may output the estimated value of the channel response in the present symbol interval as the basic component of the channel response. In addition, the channel calculator may subtract the estimated value of the channel response in the previous symbol interval from the estimated value of the channel response in the next symbol interval, divide the subtraction result by the estimated value of the channel response in the present symbol interval, and output the division result as the first order fluctuating component of the channel response.

In addition, the channel calculator may include: a first delayer delaying the estimated value of the channel response that is output from the channel estimator by one symbol interval and outputting the delayed estimated value; a second delayer delaying an output signal of the first delayer by one symbol interval again and outputting the delayed output signal; a subtraction unit subtracting the estimated value of the channel response in the previous symbol interval that is output from the second delayer from the estimated value of the channel response in the next symbol interval that is output from the channel estimator; and a divider dividing the subtraction result that is output from the subtraction unit by the estimated value of the channel response in the present symbol interval that is output from the first delayer and outputting the division result to the first multiplier as the first order fluctuating component of the channel response.

In addition, the equalizer may divide the output signal of the subtraction unit by the basic component of the channel response that is output from the first delayer to output the division result. In addition, the equalizer may be embodied as a one-tap equalizer.

The ICI mitigating equalizer according to an exemplary embodiment of the present invention requires a lesser amount of calculation and lower computational complexity as compared with a conventional technique that requires a large amount of calculation and high computational complexity in order to remove the ICI component included in the received signal.

BRIEF DESCRIPTION OF THE DRAWINGS

Exemplary embodiments of the present invention will be understood in more detail from the following description taken in conjunction with the attached drawings, in which.

DETAILED DESCRIPTION OF EXEMPLARY EMBODIMENTS

Hereinafter, the present invention will be described in detail by explaining exemplary embodiments with reference to the attached drawings.

Figure 1:
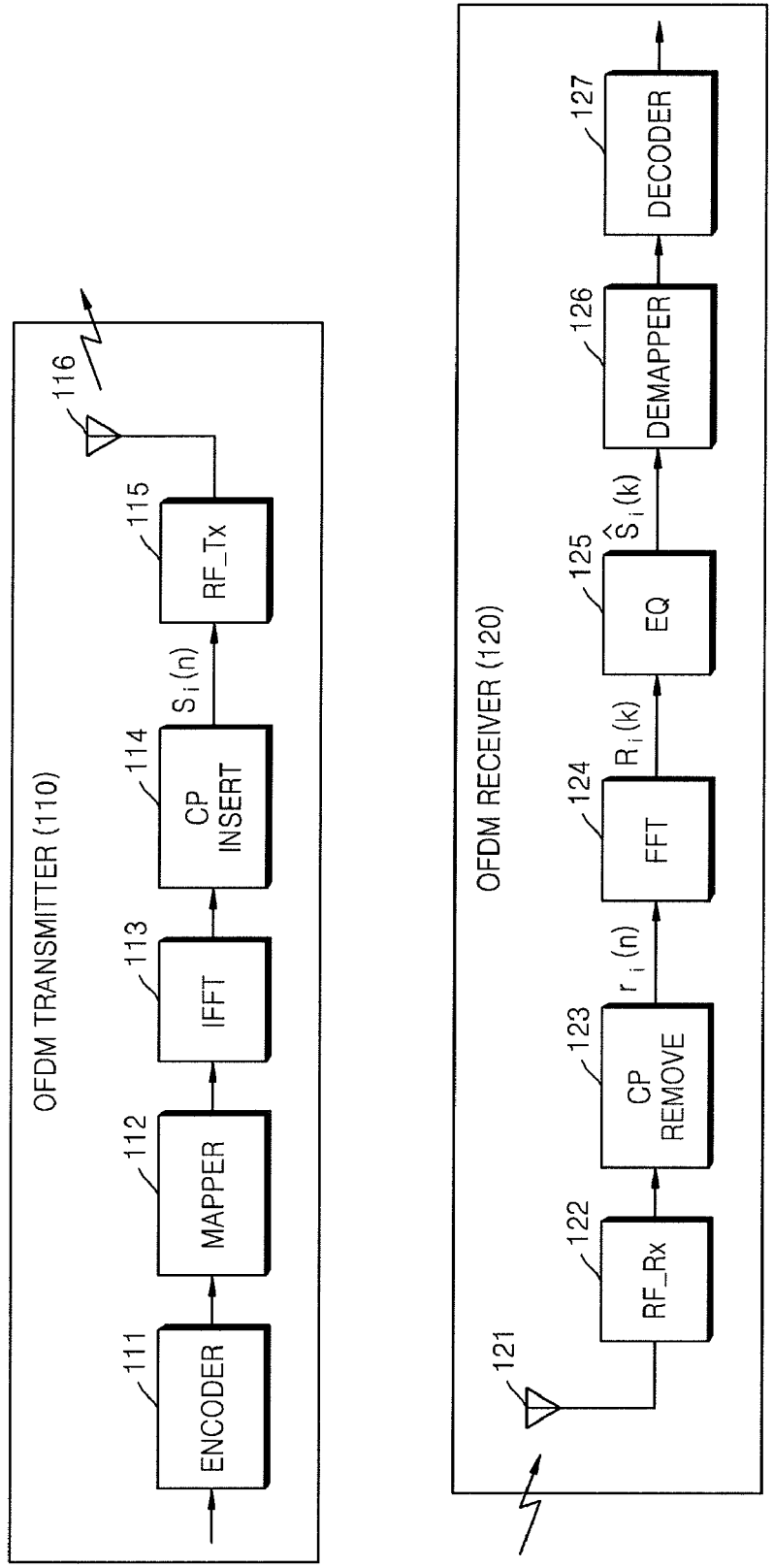
FIG. 1 illustrates examples of an orthogonal frequency division multiplexing (OFDM) transmitter and an OFDM receiver in an OFDM system.
Figure 2A:
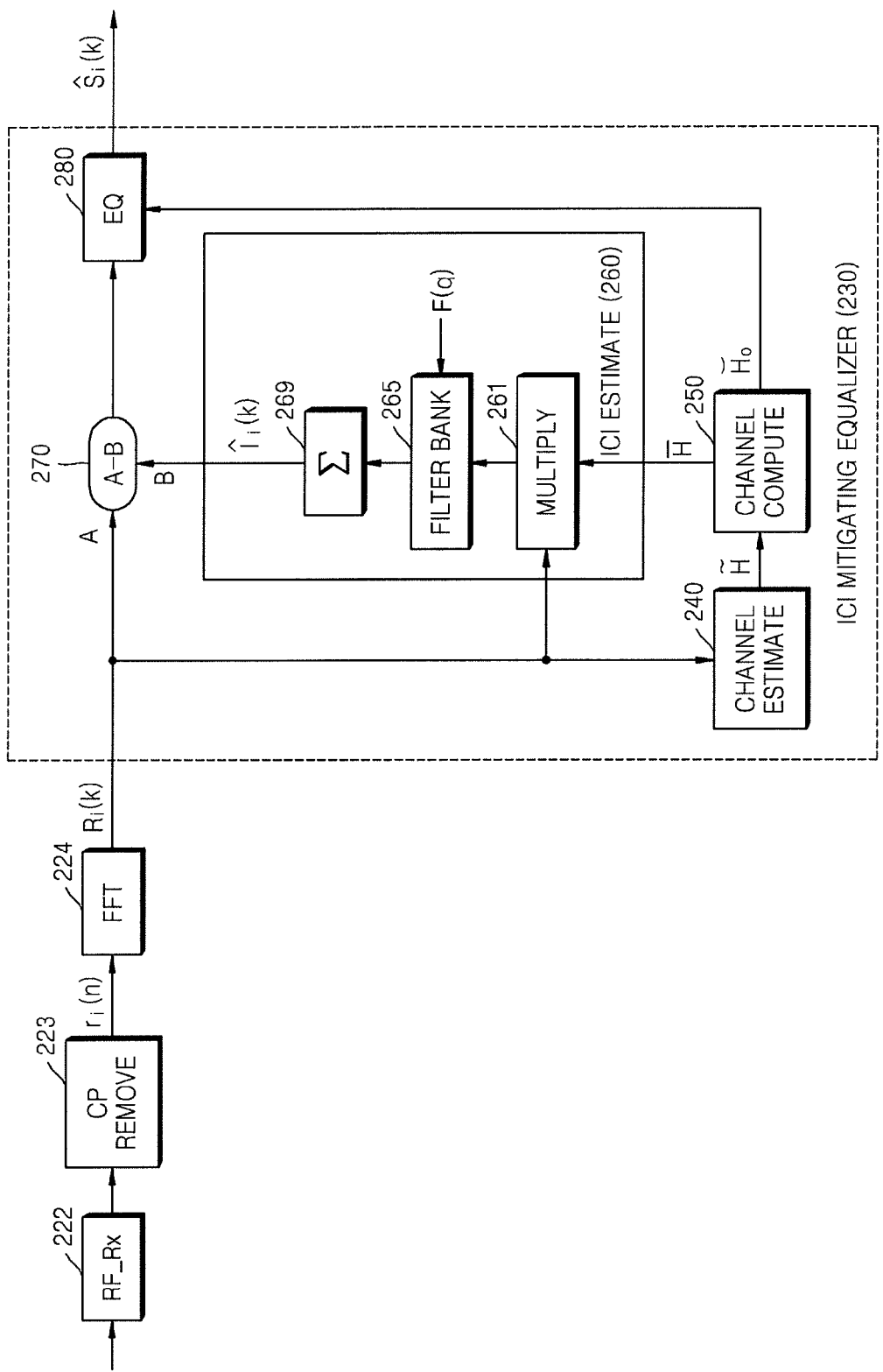
FIGS. 2A and 2B illustrate ICI mitigating equalizers according to exemplary embodiments of the present invention.
Figure 2B:
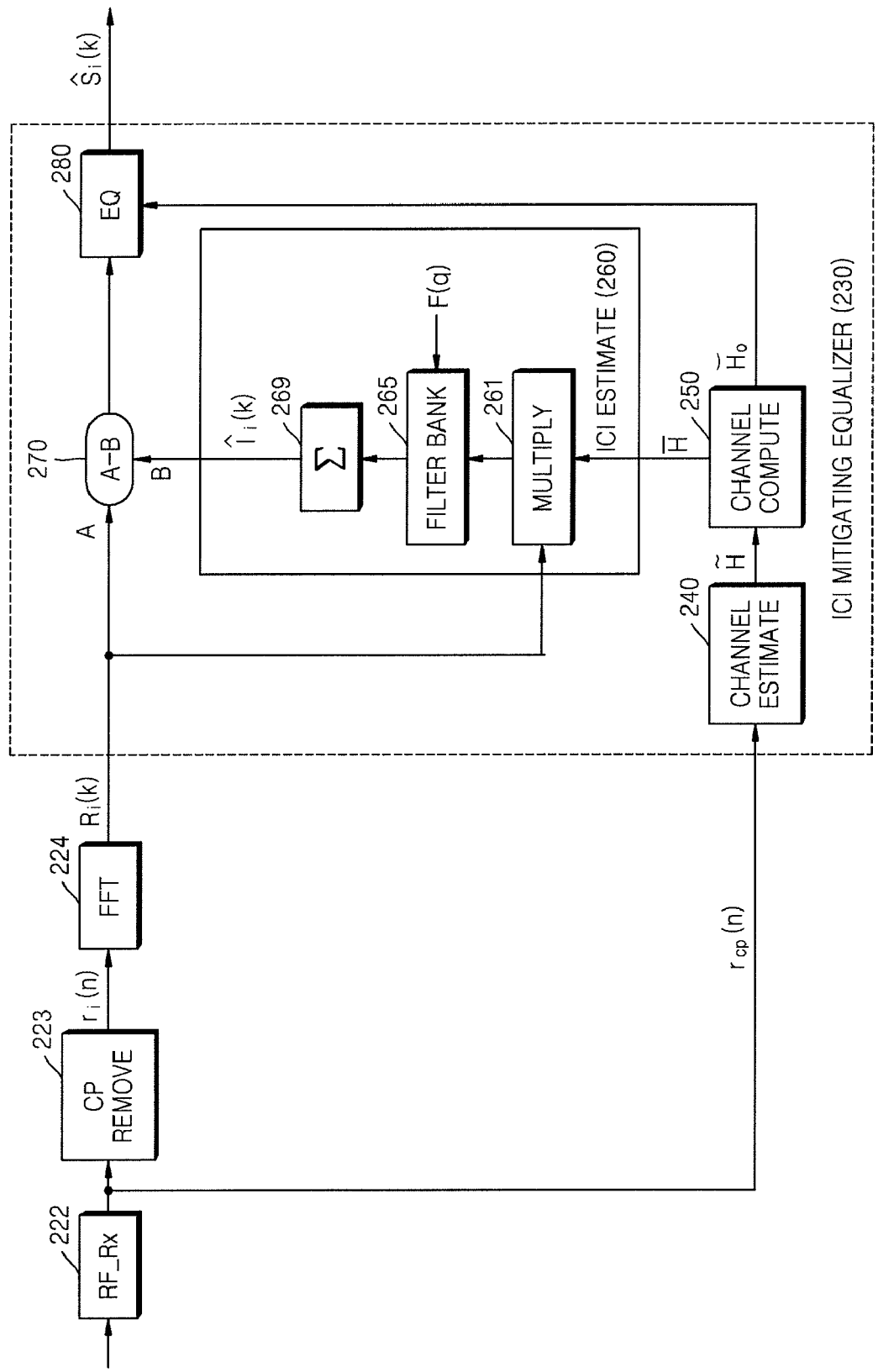

FIGS. 2A and 2B illustrate inter-carrier interference (ICI) mitigating equalizer 230 according to an exemplary embodiments of the present invention.

Referring to FIGS. 2A and 2B, an RF receiver 222, a CP remover 223, and a fast Fourier transform (FFT) block 224 are illustrated in addition to the ICI mitigating equalizer 230. The ICI mitigating equalizer 230 includes a channel estimator 240, a channel calculator 250, an ICI estimator 260, a subtracter 270, and an equalizer 280. The ICI estimator 260 illustrated in FIGS. 2A and 2B includes a multiplication unit 261, a filter bank 265, and an adder 269.

The channel estimator 240 estimates a channel response $\hat{H}$ from a received signal. FIG. 2A illustrates an exemplary embodiment in which the channel estimator 240 estimates a channel response from a received signal $R_i(k)$ in a frequency domain. FIG. 2B illustrates an exemplary embodiment in which the channel estimator 240 estimates a channel response from a received signal $r_{CP}(n)$ in a time domain. The received signal $r_{CP}(n)$ indicates a received signal before removing a cyclic prefix (CP). A received signal $r_i(n)$ indicates a received signal obtained by removing the CP. The received signal $r_i(n)$ in the time domain is transformed into the received signal $R_i(k)$ in the frequency domain by using an FFT block 224.

The channel calculator 250 calculates a basic component $\breve{H}_0$ and fluctuating components $\tilde{H}$ of a channel response from the estimated channel response $\hat{H}$. In this exemplary embodiment, the basic component $\breve{H}_0$ of the channel response is a channel response component that is time-invariant for a symbol interval. The fluctuating components $\tilde{H}$ of the channel response are channel response components that are time-variant for a symbol interval. The basic component $\breve{H}_0$ and the fluctuating components $\tilde{H}$ of the channel response will be described in detail with reference to FIG. 3.

The ICI estimator 260 multiplies the fluctuating components $\tilde{H}$ of the channel response by the received signal $R_i(k)$ in the frequency domain, filters the multiplication result according to filter coefficients $F(q)$, and estimates an ICI component included in the received signal according to the filtering result. The multiplication unit 261 of the ICI estimator 260 multiplies the fluctuating components $\tilde{H}$ of the channel response by the received signal $R_i(k)$ in the frequency domain and outputs the multiplication result. The filter bank 265 of the ICI estimator 260 filters the multiplication result that is output from the multiplication unit 261 according to the filter coefficients $F(q)$ input thereto and outputs the filtering result. The adder 269 of the ICI estimator 260 outputs an ICI component $\hat{I}_i(k)$ by adding up the filtering result that is output from the filter bank 265. The ICI estimator 260 will be described in detail with reference to FIG. 3.

The subtracter 270 subtracts the ICI component $\hat{I}_i(k)$ from the received signal $R_i(k)$ in the frequency domain. The equalizer 280 equalizes an output signal of the subtracter 270 according to the basic component $\breve{H}_0$ of the channel response. The equalizer 280 outputs the equalization result as an estimated transmitted signal $\hat{S}_i(k)$.

The ICI mitigating equalizer 230 illustrated in FIGS. 2A and 2B can be applied to a receiver of an orthogonal frequency division multiplexing (OFDM) system. That is, when a transmitted signal $S_i(n)$ that is output from the transmitter of the OFDM system is received by a receiver of the OFDM system, the ICI mitigating equalizer 230 included in the receiver of the OFDM system estimates the ICI component $\hat{I}_i(k)$ included in the received signal, removes or mitigates the ICI component included in the received signal according to the estimation result, and outputs the transmitted signal $\hat{S}_i(k)$ that is obtained by removing or mitigating the ICI component $\hat{I}_i(k)$ from the received signal.

Figure 3:
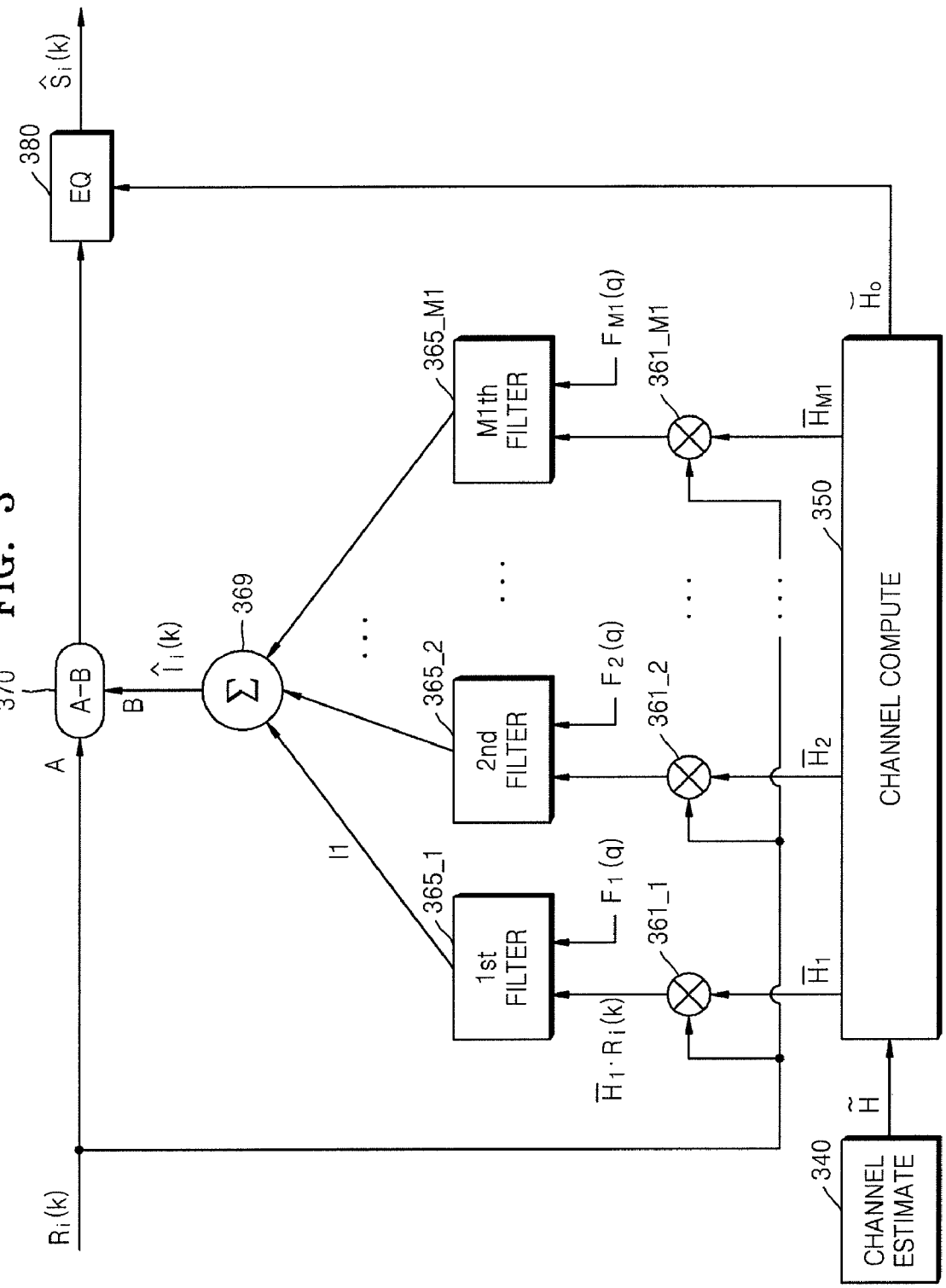
FIG. 3 illustrates the ICI mitigating equalizer of FIGS. 2A and 2B in detail, according to an exemplary embodiment of the present invention.

FIG. 3 illustrates an example of the ICI mitigating equalizer 230 of FIGS. 2A and 2B in detail, according to an exemplary embodiment of the present invention.

Referring to FIG. 3, the ICI mitigating equalizer according to an exemplary embodiment includes a channel estimator 340, a channel calculator 350, first to (M1)-th multipliers 361_1 to 361_M1, first to (M1)-th filters 365_1 to 365_M1, an adder 369, a subtracter 370, and an equalizer 380. The first to (M1)-th multipliers 361_1 to 361_M1 of FIG. 3 correspond to the multiplication unit 261 of FIGS. 2A and 2. The first to (M1)-th filters 365_1 to 365_M1 of FIG. 3 correspond to the filter bank 265 of FIGS. 2A and 2B. The adder 369 of FIG. 3 corresponds to the adder 269 of FIGS. 2A and 2B. Hereinafter, the ICI mitigating equalizer illustrated in FIG. 3 will be described with reference to the following equations.

A transmitted signal $S_i(n)$ that is output from a transmitter of an OFDM system can be represented by Equation 1 as follows:

$$s_i(n) = \frac{1}{\sqrt{N}} \sum_{k=0}^{N-1} S_i(k) e^{j\frac{2\pi}{N}kn}, \quad \text{[Equation 1]}$$

$$-N_g \le n < N,$$

where $N_g$ is a size of a cyclic prefix (CP), N is a FFT size, that is, the total number of sub-carriers, and $\{S_i(k)\}_{k=0}^{N-1}$ is an i-th quadrature amplitude modulation (QAM)-mapping symbol.

When a discrete response of a linear time variant multipath channel is $h_{ltv}(n,l)$, a channel response $h_i(n,l)$ for the path with a relative delay of l numbers of sampling intervals can be defined by Equation 2 as follows:

$$h_i(n, l) \equiv h_{ltv}(iN + iN_g + n, l), \quad \text{[Equation 2]}$$

$$-N_g \le n < N,$$

$$0 \le l < P,$$

where P is a maximum delay among delays due to a multipath.

In addition, when the transmitted signal $S_i(n)$ is represented by Equation 1 and when the channel response $h_i(n,l)$ is defined by Equation 2, the received signal $r_i(n)$ obtained by removing the CP in the receiver of the OFDM system is represented by Equation 3 as follows:

$$r_i(n) = \sum_{l=0}^{P-1} h_i(n, l) s_i(n - l) + v_i(n), \quad \text{[Equation 3]}$$

$$0 \le n < N,$$

where $v_i(n)$ is additional white Gaussian noise (AWGN).

The received signal $r_i(n)$ in the time domain is transformed into the received signal $R_i(k)$ in the frequency domain through FFT represented by Equation 4 as follows:

$$R_i(k) = \frac{1}{\sqrt{N}} \sum_{n=0}^{N-1} \sum_{l=0}^{P-1} h_i(n, l) \quad \text{[Equation 4]}$$

$$\frac{1}{\sqrt{N}} \sum_{m=0}^{N-1} S_i(m) e^{j\frac{2\pi}{N}m(n-l)} e^{-j\frac{2\pi}{N}nk} + w_i(k)$$

$$= \sum_{m=0}^{N-1} G_{k,m} S_i(m) + w_i(k)$$

where $$G_{k,m} = \frac{1}{N} \sum_{n=0}^{N-1} \sum_{l=0}^{P-1} h_i(n, l) e^{-j\frac{2\pi}{N}[n(k-m)+lm]},$$

and $w_i(k)$ is a signal obtained by transforming $v_i(n)$ through FFT.

Referring to Equation 4, the received signal in the frequency domain can be represented in a matrix form by Equation 5 as follows:

$$R_i = G_i \cdot S_i + w_i \quad \text{[Equation 5]}$$

$$R_i = [R_i(0) \ldots R_i(N-1)]^T$$

$$S_i = [S_i(0) \ldots S_i(N-1)]^T$$

$$w_i = [w_i(0) \ldots w_i(N-1)]^T$$

$$G_i = (G_{k,m})_{N \times N}$$

where the matrix $G_i$ is a channel gain matrix (or an equalization matrix). When orthogonality among sub-carriers is maintained, all the elements except the main diagonal elements of the matrix $G_i$ are zero. When the orthogonality among the sub-carriers is damaged and when the ICI component is included in the received signal, however, elements except the main diagonal elements of the matrix $G_i$ are non-zero. When the elements except the main diagonal elements of the matrix $G_i$ are non-zero, it becomes more difficult for the OFDM receiver to estimate the transmitted signal.

If the AWGN component $w_i(k)$ s excluded in Equation 5, a symbol can be estimated by Equation 6.

$$\hat{S}_i = G_i^{-1} R_i \quad \text{[Equation 6]}$$

In order to simplify the equalization matrix $G_i$, in an exemplary embodiment of the present invention, a channel is approximated to an (M1)-th order model by Equation 8.

First, a channel vector $\tilde{h}(l)$ s defined for an i-th symbol interval by Equation 7 as follows:

$$\tilde{h}(l) = [\tilde{h}_1(l) \tilde{h}_2(l) \ldots \tilde{h}_M(l)]^T \quad \text{[Equation 7]}$$

where components of the channel vector $\tilde{h}(l)$ are M numbers of sample values that are estimated from the channel response $h_{ttv}(n,l)$. The components of the channel vector $\tilde{h}(l)$ correspond to the channel response $\tilde{H}$ of FIG. 3. Referring to Equation 7, the channel that is approximated to the (M1)-th order model can be represented by Equation 8. That is, the channel response $h_i(n,l)$ can be divided into a basic component that is time-invariant for a symbol interval and fluctuating components that are time-variant for a symbol interval.

$$h_i(n, l) = \underbrace{\tilde{h}_0(l)}_{basic\ component} + \underbrace{\sum_{p=1}^{M_1} \alpha_p(n) \tilde{h}_p(l)}_{fluctuating\ component}, \quad \text{[Equation 8]}$$

$$-N_g \leq n < N,$$

$$\tilde{h}_p(l) = \sum_{q=1}^{M} \beta_{pq} \tilde{h}_q(l),$$

In Equation 8, $0 \leq p \leq M_1$, and the (M1)-th order model of the channel is determined by $\alpha_p(n)$ and a channel coefficient $\beta_{pq}$. In an exemplary embodiment of the present invention, the channel coefficient $\beta_{pq}$ can be set to a constant for an i-th symbol interval. In addition, in an embodiment of the present invention, $\alpha_p(n)$ can be set so as to satisfy Equation 9.

$$\sum_{n=0}^{N-1} \alpha_p(n) = 0 \quad \text{[Equation 9]}$$

As shown in Equation 8, $\alpha_p(n)$ is related to the fluctuating components of the channel response. In the fluctuating components of the channel response in Equation 8, an argument n is separated from an argument l. On the other hand, the basic component of the channel response includes most of the decisive energy of the channel response $h_i(n,l)$.

Equation 10 is obtained by substituting Equation 8 for $h_i(n,l)$ in the equation of $G_{k,m}$ in Equation 4.

$$G_{k+m,k} = \frac{1}{N} \sum_{n=0}^{N-1} \sum_{l=0}^{P-1} \left( \tilde{h}_0(l) + \sum_{p=1}^{M_1} \alpha_p(n) \sum_{q=1}^{M} \beta_{pq} \tilde{h}_q(l) \right) \quad \text{[Equation 10]}$$

$$e^{-j\frac{2\pi}{N}[nm+lk]}$$

$$= \tilde{H}_0(k) \delta(m) + \sum_{p=1}^{M_1} F_p(m) \tilde{H}_p(k)$$

In Equation 10, $\delta(m)$ is a Kronecker delta, that is, a unit delta function, $$F_p(m) = \frac{1}{N} \sum_{n=0}^{N-1} \alpha_p(n) e^{-j\frac{2\pi}{N}nm}, 0 < p \leq M_1,$$

and $$\tilde{H}_p(k) = \sum_{l=0}^{P-1} \tilde{h}_p(l) e^{-j\frac{2\pi}{N}lk}, 0 \leq p \leq M_1.$$

Equation 10 can be represented as a matrix form by Equation 11 as follows:

$$G_i = \tilde{H}_0 + \sum_{p=1}^{M_1} F_p \tilde{H}_p \quad \text{[Equation 11]}$$

where $$\tilde{H}_p = \text{diag}([\tilde{H}_p(0) \quad \tilde{H}_p(1) \quad \ldots \quad \tilde{H}_p(N-1)]).$$

That is, $\tilde{H}_p$ is an N×N diagonal matrix.

In addition, a filter coefficient matrix $F_p$ in Equation 11 is as follows:

$$F_p = \begin{bmatrix} 0 & F_p(-1) & \ldots & F_p(1-N) \\ F_p(1) & 0 & \ldots & F_p(2-N) \\ & & \ddots & \\ F_p(N-1) & F_p(N-2) & \ldots & 0 \end{bmatrix}$$

where the filter coefficient matrix $F_p$ is independent of a symbol index i and has a Toplitzian property.

Equation 12 is obtained by substituting Equation 11 for $G_i$ of Equation 6.

$$\hat{S}_i = (\tilde{H}_0)^{-1} \left( I_{N \times N} + \sum_{p=1}^{M_1} F_p \overline{H}_p \right)^{-1} R_i \quad \text{[Equation 12]}$$

In Equation 12, $I_{N \times N}$ is an N×N identity matrix, and $\overline{H}_p = \tilde{H}_p (\tilde{H}_0)^{-1} = \text{diag}([\tilde{H}_p(0)/\tilde{H}_0(0) \ldots \tilde{H}_p(N-1)/\tilde{H}_0(N-1)])$, for $p \neq 0$. In this exemplary embodiment, $\overline{H}_p$ corresponds to normalized fluctuating components.

Equation 13 is obtained by truncating high-order components so as to simplify Equation 12.

$$\hat{S}_i = \left(\breve{H}_0\right)^{-1}\left(I_{N \times N} - \sum_{p=1}^{M_1} F_p \overline{H}_p\right) R_i \quad \text{[Equation 13]}$$

$$= \left(\breve{H}_0\right)^{-1}\left(R_i - \sum_{p=1}^{M_1} F_p \overline{H}_p R_i\right)$$

Because the channel response is changed very slowly for the symbol interval, $\alpha_p(n)$ is also changed very slowly. Accordingly, $F_p(m)$ obtained by transforming $\alpha_p(n)$ through FFT has a low-pass property. In an exemplary embodiment of the present invention, only components due to 2Qp numbers of sub-carriers among N numbers of sub-carriers are considered according to the aforementioned property. That is, only sub-carriers of which carrier indices ranges from −Qp to +Qp are considered. Equation 14 is induced from Equation 13 by reflecting the aforementioned fact.

$$\hat{S}_i(k) = \left(R_i(k) - \underbrace{\sum_{p=1}^{M_1} \sum_{q=-Q_p}^{Q_p} F_p(q)\overline{H}_p(k-p)R_i(k-q)}_{\text{ICI components } \hat{I}_i(k)}\right) \frac{1}{\breve{H}_0(k)} \quad \text{[Equation 14]}$$

Hereinafter, an exemplary embodiment of the present invention will be described with reference to Equation 14 and FIG. 3.

The channel calculator 350 calculates a basic component $\breve{H}_0$ and fluctuating components $\overline{H}$ of a channel response from the estimated channel response $\tilde{H}$ or $\tilde{h}$ that is received from the channel estimator 340. Equation 15 is obtained by transforming both sides of Equation 8 of $\breve{h}_p(l)$ through FFT.

$$\breve{H}_p(k) = \sum_{q=1}^{M} \beta_{pq} \tilde{H}_q(k), \quad \text{[Equation 15]}$$

$$0 \leq p \leq M_1,$$

The channel calculator 350 calculates $\breve{H}_p$ ($0 \leq p \leq M1$) from the estimated channel response H by using Equation 15. Here, $\breve{H}_p$ (p=0) is output to the equalizer 380 as the basic component $\breve{H}_0$ of the channel response. In addition, the channel calculator 350 calculates $\overline{H}_p$ ($1 \leq p \leq M1$) from $\breve{H}_p$ by using a relation between $\overline{H}_p$ and $\breve{H}_p$ in Equation 12. As illustrated in FIG. 3, when a channel is approximated to an (M1)-th order model, the channel calculator 350 outputs first order to (M1)-th order fluctuating components $\overline{H}_1$ to $\overline{H}_{M1}$ of the channel response.

In FIG. 3, the first multiplier 361_1 multiplies the first order fluctuating component $\overline{H}_1$ of the channel response by the received signal $R_i(k)$ in the frequency domain and outputs the first multiplication result $\overline{H}_1 \cdot R_i(k)$. Similarly, the (M1)-th multiplier 361_M1 multiplies the (M1)-th order fluctuating component $\overline{H}_{M1}$ of the channel response by the received signal $R_i(k)$ in the frequency domain and outputs the (M1)-th multiplication result $\overline{H}_{M1} \cdot R_i(k)$.

In FIG. 3, the first filter 365_1 filters the first multiplication result $\overline{H}_1 \cdot R_i(k)$ that is output from the first multiplier 361_1 according to first filter coefficients $F_1(q)$ and outputs the first filtering result I1. Similarly, the (M1)-th filter 365_M1 filters the (M1)-th multiplication result that is output from the (M1)-th multiplier 361_M1 according to (M1)-th filter coefficients $F_{M1}(q)$ and outputs the (M1)-th filtering result. In an exemplary embodiment of the present invention, the first to (M1)-th filters 365_1 to 365_M1 may be embodied as finite impulse response (FIR) filters. For example, the filters 365_1 to 365_M1 included in the filter bank 265 calculate $$\sum_{q=-Q_p}^{Q_p} F_p(q)\overline{H}_p(k-p)R_i(k-q). \quad \text{in Equation 14}$$

Hereinafter, the FIR filters will be described with reference to FIG. 4.

Figure 4:
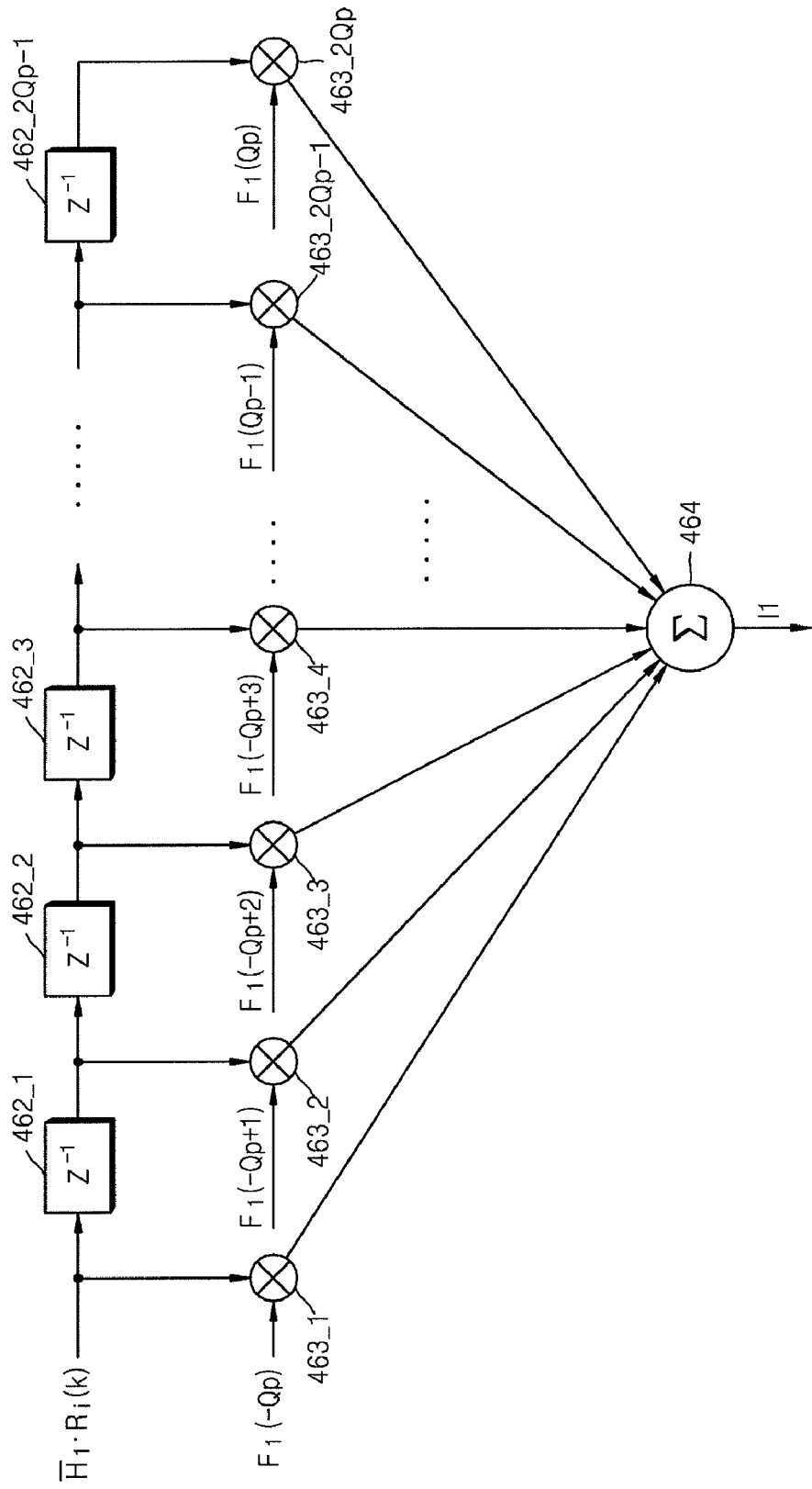
FIG. 4 illustrates an example of a first filter of the ICI mitigating equalizer of FIG. 3, according to an exemplary embodiment of the present invention.

FIG. 4 illustrates an example of the first filter 365_1 of the ICI mitigating equalizer of FIG. 3, according to an exemplary embodiment of the present invention.

Referring to FIG. 4, the first filter 365_1 that is embodied as a FIR filter according to the current exemplary embodiment includes a plurality of delayers 462_1 to 462_2Qp-1, a plurality of multipliers 463_1 to 463_2Qp, and an adder 464. The first filter 365_1 performs an FIR-filtering process by receiving the first multiplication result $\overline{H}_1 \cdot R_i(k)$ and first filter coefficients $F_1(-Qp)$ to $F_1(Qp)$. The adder 464 outputs the first filtering result I1 to the adder 369 of FIG. 3.

Although FIG. 4 only illustrates the first filter 365_1 of FIG. 3, the second to (M1)-th filters 365_2 to 365_M1 may also have the same structure as that of the first filter 365_1 illustrated in FIG. 4. According to an exemplary embodiment of the present invention, the first to (M1)-th filters 365_1 to 365_M1 are linear time-invariant filters. In FIG. 3, the first to (M1)-th filter coefficients $F_1(q)$ to $F_{M1}(q)$ are linearly time-invariant. In addition, according to an exemplary embodiment of the present invention, filter coefficients of filters included in the filter bank 265 may be set to the same value or different values. On the other hand, the number of filter taps of each of the first to (M1)-th filters 365_1 to 365_M1 is determined according to system requirements. For example, the numbers of filter taps of the filters may be the same or different from one another. More specifically, as mobility of the OFDM receiver increases, a FIR filter having more taps is required.

In FIG. 3, the adder 369 outputs the ICI component $\hat{I}_i(k)$ by adding up the first to the (M1)-th filtering results that are respectively output from the first to (M1)-th filters 365_1 to 365_M1 of the filter bank 265. For example, the adder 369 calculates $$\sum_{p=1}^{M_1} \sum_{q=-Q_p}^{Q_p} F_p(q)\overline{H}_p(k-p)R_i(k-q). \quad \text{in Equation 14}$$

In FIG. 3, the subtracter 370 subtracts the ICI component $\hat{I}_i(k)$ from the received signal $R_i(k)$ in the frequency domain. For example, the subtracter 370 may calculate $$R_i(k) - \sum_{p=1}^{M_1} \sum_{q=-Q_p}^{Q_p} F_p(q)\overline{H}_p(k-p)R_i(k-q). \quad \text{in Equation 14}$$

In FIG. 3, the equalizer 380 equalizes the output signal of the subtracter 370 according to the basic component $\widetilde{H}_0$ of the channel response. According to an exemplary embodiment of the present invention, the equalizer 380 may be embodied as a one-tap equalizer. The equalizer 380 that is embodied as a one-tap equalizer divides the output signal of the subtracter 370 by the basic component $\widetilde{H}_0$ of the channel response and outputs the quotient as the transmitted signal $\hat{S}_i(k)$. For example, the equalizer 380 that is embodied as a one-tap equalizer may calculate $$R_i(k) - \sum_{p=1}^{M_1} \sum_{q=-Q_p}^{Q_p} F_p(q) \frac{\overline{H}_p(k-p)R_i(k-q)}{\widetilde{H}_0(k)}.$$

in Equation 14

As described above, the ICI mitigating equalizer for estimating and removing the ICI component included in the received signal according to an exemplary embodiment of the present invention performs $(2\Sigma_{p=1}^{M_1}Q_p+M_1)\times N$ numbers of complex multiplications. The ICI mitigating equalizer according to an exemplary embodiment of the present invention requires a lesser amount of calculation and a lower computational complexity as compared with a conventional technique that requires a large amount of calculation and high computational complexity in order to remove the ICI component included in the received signal.

Figure 5:
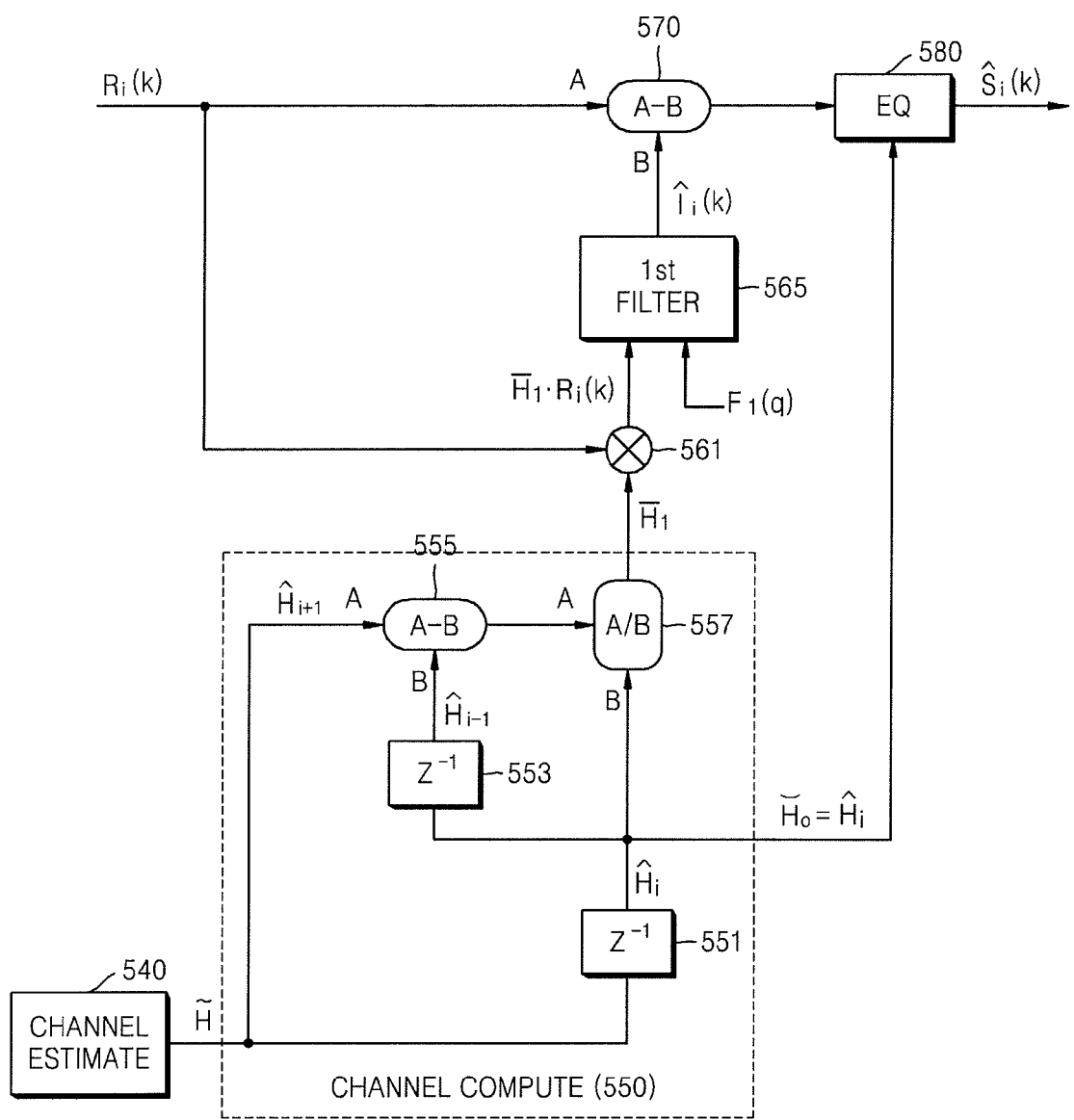
FIG. 5 illustrates an example of an ICI mitigating equalizer in a case where a channel is approximated to a first order model, according to an exemplary embodiment of the present invention.

On the other hand, in FIG. 3, the first multiplier 361_1 and the first filter 365_1 form a first filtering path. The second multiplier 361_2 and the second filter 365_2 form a second filtering path. Similarly, the (M1)-th multiplier 361_M1 and the (M1)-th filter 365_M1 form an (M1)-th filtering path. As illustrated in FIG. 3, in a case where a channel is approximated to an (M1)-th order model, the ICI mitigating equalizer according to an exemplary embodiment of the present invention includes a number, M1, of filtering paths. That is, in a case where a channel is approximated to a first order model, one filtering path is included in the ICI mitigating equalizer. In a case where a channel is approximated to a second order model, two filtering paths are included in the ICI mitigating equalizer. In a case where a channel is approximated to the (M1)-th order model, M1 filtering paths are included in the ICI mitigating equalizer. An exemplary embodiment for a case where a channel is approximated to the first order model is illustrated in FIG. 5 and will be described later with reference to FIG. 5.

A method of estimating ICI according to an exemplary embodiment of the present invention will be described below based on the aforementioned description.

First, first order to (M1)-th order fluctuating components $\overline{H}_1$ to $\overline{H}_{M1}$ of a channel response are calculated from a channel response $\hat{H}$ or $\hat{h}$ that is estimated from a received signal. Then, first to (M1)-th multiplication results $\overline{H}_1 \cdot R_i(k)$ to $\overline{H}_{M1} \cdot R_i(k)$ are output by multiplying the first order to (M1)-th order fluctuating components $\overline{H}_1$ to $\overline{H}_{M1}$ of the channel response by a received signal $R_i(k)$ in a frequency domain. The first to (M1)-th filtering results are output by FIR-filtering the first to (M1)-th multiplication result $\overline{H}_1 \cdot R_i(k)$ to $\overline{H}_{M1} \cdot R_i(k)$ according to first to (M1)-th filter coefficients $F_1(q)$ to $F_{M1}(q)$. Then, an ICI component $\hat{I}_i(k)$ included in the received signal is estimated by adding up the first to (M1)-th filtering result.

As described above, in a case where a channel is approximated to the (M1)-th order model, the channel response $\hat{H}$ or $\hat{h}$ that is estimated from the received signal can be divided into a basic component that is time-invariant for a symbol interval and first order to (M1)-th order fluctuating components that are time-variant for a symbol interval.

FIG. 5 illustrates an example of an ICI mitigating equalizer in a case where a channel is approximated to a first order model, according to an exemplary embodiment of the present invention.

Referring to FIG. 5, the ICI mitigating equalizer according to the current exemplary embodiment includes a channel estimator 540, a channel calculator 550, a first multiplier 561, a first filter 565, a subtracter 570, and an equalizer 580. In FIG. 5, the channel calculator 550 includes first and second delayers 551 and 553, a subtracter 555, and a divider 557. In a case where a channel is approximated to the first order model, because the ICI mitigating equalizer includes only a filtering path, the ICI mitigating equalizer illustrated in FIG. 5 does not require a component such as the adder 369 of FIG. 3.

The channel estimator 540 estimates a channel response $\tilde{H}$ or $\tilde{h}$ that is estimated from a received signal. Hereinafter, an estimation of a channel response by a channel estimator 540 in a case where a channel is approximated to a first order linear model will be described with reference to FIG. 6.

Figure 6:
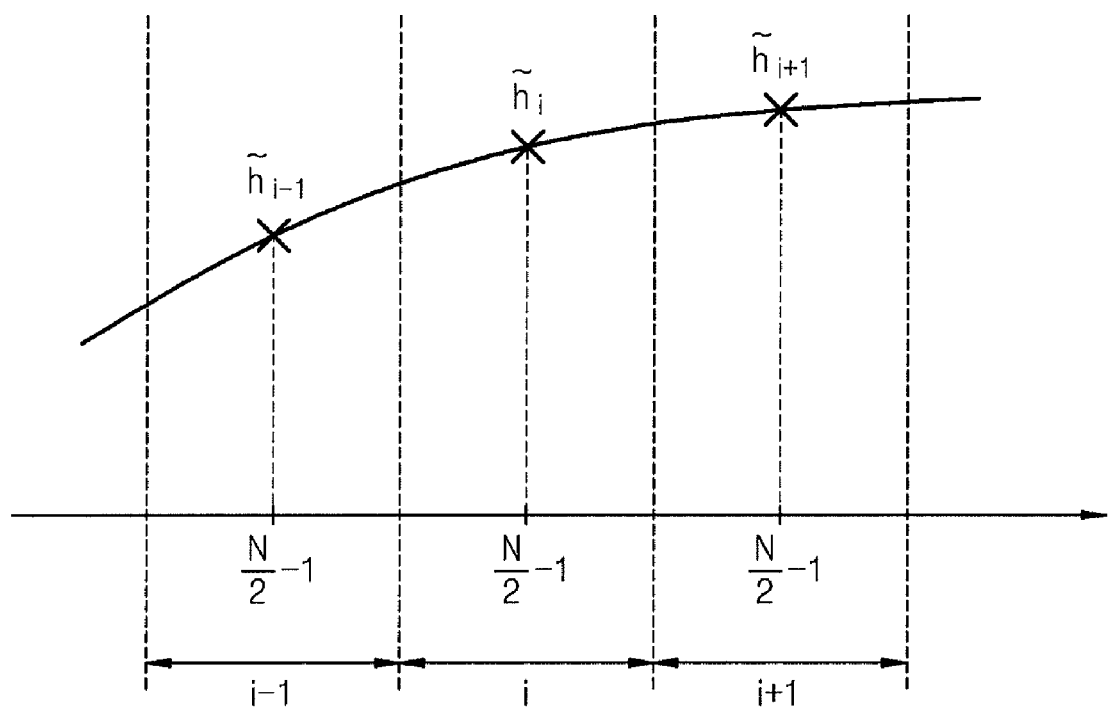
FIG. 6 illustrates an example of a channel response in (i−1)-th to (i+1)-th symbol intervals.

FIG. 6 illustrates an example of channel responses in (i-1)-th to (i+1)-th symbol intervals.

Referring to FIG. 6, the channel estimator 540 can take a sample value of a channel response at the center of each of the symbol intervals. That is, it is possible to take a sample value of a channel response at a position of (N/2)-1 among the symbol intervals 0 to (N-1).

The i-th symbol is assumed to be a present symbol. A case where sample values of channel responses in the (i-1)-th to (i+1)-th symbol intervals are used so as to approximate a channel to the first order linear model for the i-th symbol interval is considered. In this case, the channel estimator 540 outputs an estimated value $\hat{H}_{i-1}$ of a channel response in the previous symbol interval according to a sample value of a channel response at the center of the (i-1)-th symbol interval, outputs an estimated value $\hat{H}_i$ of a channel response in the present symbol interval according to a sample value of a channel response at the center of the i-th symbol interval, and outputs an estimated value $\hat{H}_{i+1}$ of a channel response in the next symbol interval according to a sample value of a channel response at the center of (i+1)-th symbol interval. It will be understood by those of ordinary skill in the art that $\hat{H}_{i-1}$ corresponds to $\tilde{H}_{i-1}$, $\hat{H}_i$ corresponds to $\tilde{H}_i$, and $\hat{H}_{i+1}$ corresponds to $\tilde{H}_{i+1}$.

In a case where a channel is approximated to a first order linear model for the i-th symbol interval by using a sample value $\hat{h}_{i-1}$ of the channel response at the center of the (i-1)-th symbol interval and a sample value $\hat{h}_{i+1}$ of the channel response at the center of the (i+1)-th symbol interval, Equation 7 that defines the channel vector for the i-th symbol interval can be represented by Equation 16. Here, M in Equation 7 is 3 in Equation 16.

$$\tilde{h}^{(l)}(n,l) = [\hat{h}_{i-1}(N/2-1,l)\hat{h}_i(N/2-1,l)\hat{h}_{i+1}(N/2-1,l)]^T \quad \text{[Equation 16]}$$

In order to approximate the channel to the first order linear model, Equation 17 is obtained by substituting 1 for M1 of Equation 8.

$$h_i(n,l) = \underbrace{\breve{h}_0(l)}_{\text{basic component}} + \underbrace{\alpha_1(n)\breve{h}_1(l)}_{\text{fluctuating component}},$$ [Equation 17]

$$-N_g \le n < N,$$

On the other hand, Equation 19 is obtained by substituting Equation 18 for the channel coefficient $\beta_{pq}$ included in an equation of $\breve{h}_p(l)$ in Equation 8.

$$\begin{bmatrix} \beta_{01} & \beta_{02} & \beta_{03} \\ \beta_{11} & \beta_{12} & \beta_{13} \end{bmatrix} = \begin{bmatrix} 0 & 1 & 0 \\ -1 & 0 & 1 \end{bmatrix}$$ [Equation 18]

$$\breve{h}_0(l) = \tilde{h}_i(N/2-1,l)$$ [Equation 19]

$$\breve{h}_1(l) = \tilde{h}_{i+1}(N/2-1,l) - \tilde{h}_{i-1}(N/2-1,l)$$

A minimum-mean-squared-error (MMSE) of a signal obtained by transforming $\breve{h}_i(l)$ through FFT is estimated by Equation 20 with reference to an equation of $\breve{h}_1(l)$ in Equation 19.

$$dH_1(k) = \hat{H}_{i+1}(k) - \hat{H}_{i-1}(k)$$ [Equation 20]

The first order fluctuating component $\overline{H}_1$ of the channel response can be calculated by Equation 21 by using an equation of $\overline{H}_p$ in Equations 19, 20, and 12.

$$\overline{H}_1 = \frac{\hat{H}_{i+1}(k) - \hat{H}_{i-1}(k)}{\hat{H}_i(k)} = \frac{dH_i(k)}{\hat{H}_i(k)}$$ [Equation 21]

The basic component of the channel response can be represented by Equation 22 with reference to an equation of $\breve{h}_0(l)$ in Equation 19. In this exemplary embodiment, the basic component of the channel response is a mean value of the channel responses in the (i−1)-th to (i+1)-th symbol intervals.

$$\breve{H}_0 = \hat{H}_i(k)$$ [Equation 22]

Equation 23 is obtained by rewriting Equation 14 according to Equations 16 to 22 so as to be suitable for a case where a channel is approximated to the first order linear model.

$$\hat{S}_i(k) = \left( R_i(k) - \underbrace{\sum_{q=-Q}^{Q} F_1(q) \frac{dH_i(k-p)}{\hat{H}_i(k-p)} R_i(k-q)}_{\text{ICI components}, \hat{I}_i(k)} \right) \frac{1}{\hat{H}_i(k)}$$ [Equation 23]

$$= \frac{R_i(k) - \hat{I}_i(k)}{\hat{H}_i(k)}$$

Here, $F_1(q)$ in Equation 23 is obtained by transforming $\alpha_1(n)$ in Equation 17 through FFT. As shown in FIG. 5, $F_1(q)$ are first filter coefficients that are input into the first filter 565. In a case where a channel is approximated to the first order linear model in the i-th symbol interval, $\alpha_1(n)$ may be set by Equation 24.

$$\alpha_1(n) = \frac{n - N/2 + 1}{2(N/N_g)}$$ [Equation 24]

Hereinafter, the ICI mitigating equalizer shown in FIG. 5 will be described with reference to Equation 23.

In FIG. 5, the channel calculator 550 calculates a basic component $\breve{H}_0$ and a first order fluctuating component $\overline{H}_1$ of the channel response by using the estimated value $\hat{H}_{i-1}$ of the channel response in the previous symbol interval, the estimated value $\hat{H}_i$ of the channel response in the current symbol interval, and the estimated value $\hat{H}_{i+1}$ of the channel response in the next symbol interval. As described above, the basic component $\breve{H}_0$ of the channel response is a channel response component that is time-invariant for a symbol interval, and the first order fluctuating component $\overline{H}_1$ of the channel response is a channel response component that is time-variant for a symbol interval.

As shown in FIG. 5, the channel calculator 550 outputs the estimated value $\hat{H}_i$ of the channel response in the current symbol interval as the basic component $\breve{H}_0$ of the channel response. In addition, the channel calculator 550 subtracts the estimated value $\hat{H}_{i-1}$ of the channel response in the previous symbol interval from the estimated value $\hat{H}_{i+1}$ of the channel response in the next symbol interval, divides the subtraction result by the estimated result $\hat{H}_i$ of the channel response in the current symbol interval, and outputs the division result as the first order fluctuating component $\overline{H}_1$ of the channel response. That is, the channel calculator 550 performs a calculation of Equation 22 and a calculation of Equation 21.

In order to calculate Equations 22 and 21, the first delayer 551 included in the channel calculator 550 delays the estimated value of the channel response that is output from the channel estimator 540 by a symbol interval and outputs the delayed estimated value. The second delayer 553 included in the channel calculator 550 delays the output signal of the first delayer 551 by a symbol interval again and outputs the delayed output signal. The subtracter 555 included in the channel calculator 550 subtracts the estimated value $\hat{H}_{i-1}$ of the channel response in the previous symbol interval that is output from the second delayer 553 from the estimated value $\hat{H}_{i+1}$ of the channel response in the next symbol interval that is output from the channel estimator 540. The divider 557 included in the channel calculator 550 divides the subtraction result that is output from the subtracter 555 by the estimated value $\hat{H}_i$ of the channel response in the current symbol interval that is output from the first delayer 551 and outputs the division result to the first multiplier 561 as the first order fluctuating component $\overline{H}_1$.

In FIG. 5, the first multiplier 561 multiplies the first order fluctuating component $\overline{H}_1$ of the channel response by the received signal $R_i(k)$ in the frequency domain and outputs the first multiplication result $\overline{H}_1 \cdot R_i(k)$.

In FIG. 5, the first filter 565 outputs the ICI component $\hat{I}_i(k)$ included in the received signal by FIR-filtering the first multiplication result $\overline{H}_1 \cdot R_i(k)$ according to the first filter coefficients $F_1(q)$. For example, the first filter 565 calculates $$\sum_{q=-Q}^{Q} F_1(q) \frac{dH_i(k-p)}{\hat{H}_i(k-p)} R_i(k-q).$$

in Equation 23

In FIG. 5, the subtracter 570 subtracts the ICI component $\hat{I}_i(k)$ from the received signal $R_i(k)$ in the frequency domain. For example, the subtracter 570 calculates $$R_i(k) - \sum_{q=-Q}^{Q} F_1(q) \frac{dH_i(k-p)}{\hat{H}_i(k-p)} R_i(k-q). \qquad \text{in Equation 23}$$

In FIG. 5, the equalizer 580 equalizes the output signal of the subtracter 570 according to the basic component $\widetilde{H}_0$ of the channel response. The equalizer of FIG. 5 can be embodied as a one-tap equalizer. The equalizer 580 that is embodied as the one-tap equalizer divides the output signal of the subtracter 570 by the basic component $\hat{H}_i$ of the channel response that is output from the first delayer 551 and outputs the division result as the estimated transmitted signal $\hat{S}_i(k)$. For example, the equalizer 580 that is embodied as the one-tap equalizer calculates $$\frac{R_i(k) - \hat{I}_i(k)}{\hat{H}_i(k)}. \qquad \text{in Equation 23}$$

Figure 7:
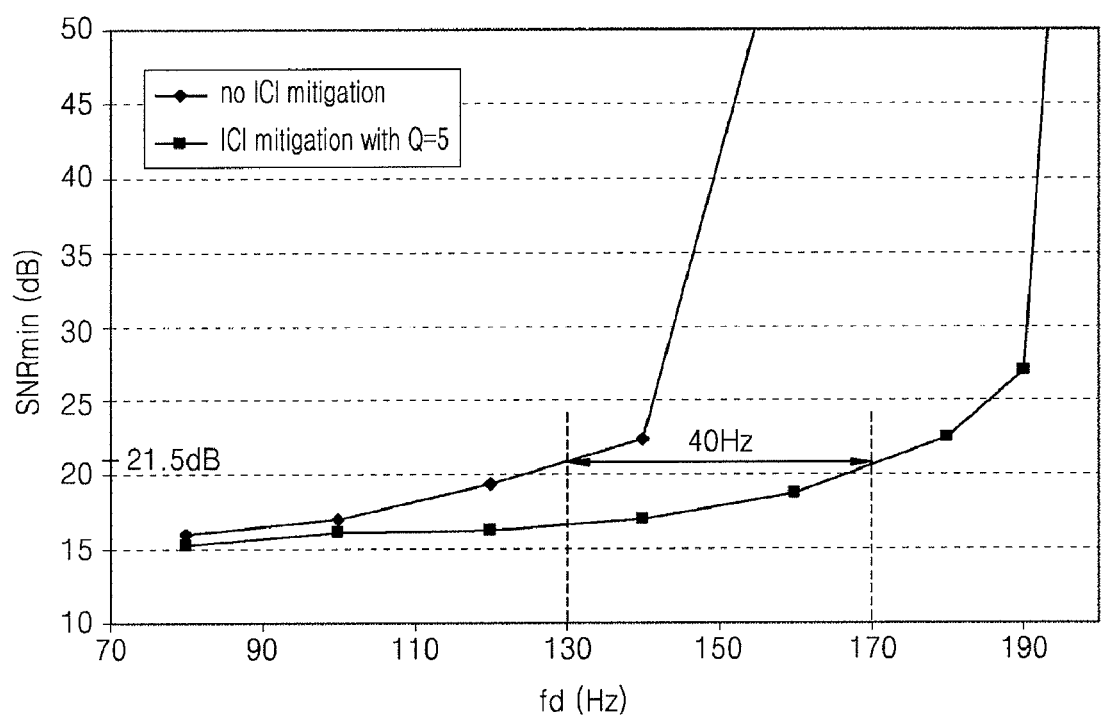
FIG. 7 is a simulation graph illustrating a relation between a maximum Doppler shift fd and a minimum signal-to-noise ratio (SNR) SNRmin, in a case where the ICI mitigating equalizer illustrated in FIG. 5 is applied to a receiver of a digital video broadcasting-handheld (DVB-H) system.

FIG. 7 is a simulation graph illustrating a relation between a maximum Doppler frequency shift fd and a minimum signal-to-noise ratio (SNR) SNRmin, in a case where the ICI mitigating equalizer shown in FIG. 5 is applied to a receiver of a digital video broadcasting-handheld (DVB-H) system.

Figure 8:
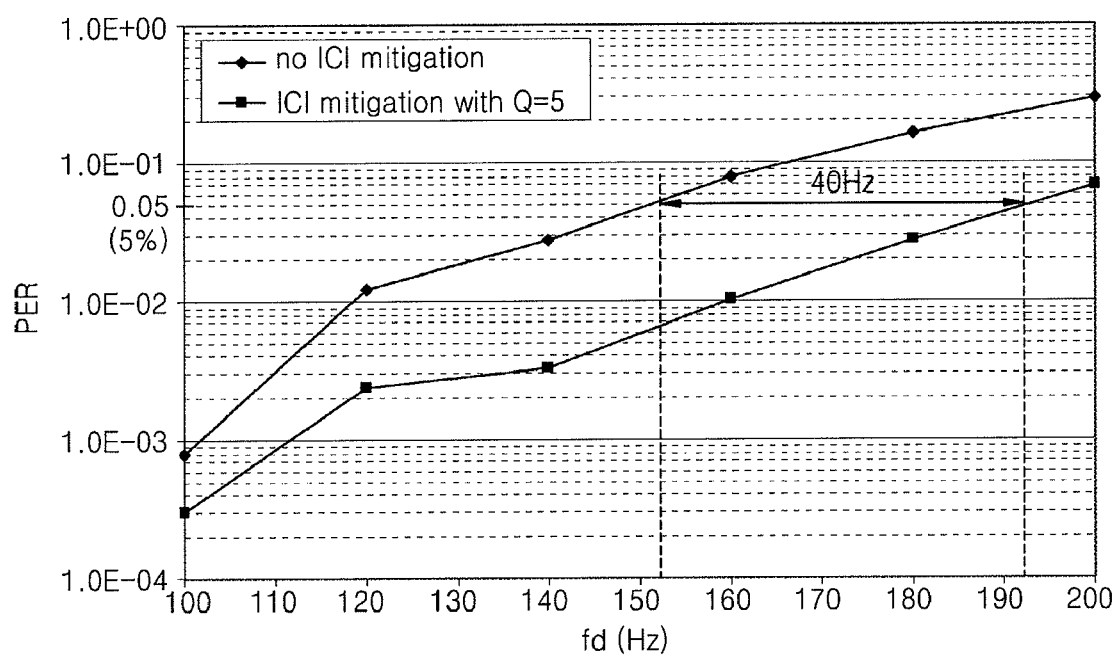
FIG. 8 is a simulation graph illustrating a relation between a maximum Doppler shift fd and a packet error rate (PER), in a case where the ICI mitigating equalizer illustrated in FIG. 5 is applied to a receiver of a DVB-H system.

FIG. 8 is a simulation graph illustrating a relation between a maximum Doppler frequency shift fd and a packet error rate (PER), in a case where the ICI mitigating equalizer shown in FIG. 5 is applied to a receiver of a DVB-H system.

The simulation conditions of FIGS. 7 and 8 will be described below. In the DVB-H system, an FFT size is 8k, a guard interval ratio is ¼, a 16 QAM method is employed, and a COST207 TU6 channel is tested. In the simulation responses shown in FIGS. 7 and 8, the number Q of filter taps of the first filter 565 of FIG. 5 is set to 5.

In FIG. 7, the SNRmin indicates a minimum SNR value for satisfying a condition that a PER is equal to or less than 5%. If the SNRmin is set to 21.5 dB, in a case where ICI mitigation is performed with Q=5 according to an exemplary embodiment of the present invention, a performance gain is increased by 40 Hz, as compared with a case where the ICI mitigation is not performed.

In FIG. 8, a PER based on the maximum Doppler frequency shift fd in a case where the SNR value is set to 50 dB is shown. In FIG. 8, if the PER is 5%, in a case where ICI mitigation is performed with Q=5 according to an exemplary embodiment of the present invention, the performance gain is increased by 40 Hz as compared with a case where the ICI mitigation is not performed.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An inter-carrier interference (ICI) mitigating equalizer comprising:
    a channel estimator estimating a channel response based on a received signal;
    a channel calculator calculating a basic component and fluctuating components of a channel response based on the estimated channel response;
    an ICI estimator multiplying the fluctuating components of the channel response by the received signal in a frequency domain, filtering the multiplication results according to predetermined filter coefficients, and estimating an ICI component included in the received signal based on the filtering results;
    a subtracter subtracting the ICI component from the received signal in the frequency domain; and
    an equalizer equalizing an output signal of the subtracter based on the basic component of the channel response, wherein the channel calculator comprises:
    a first delayer delaying the estimated value of the channel response that is output from the channel estimator by one symbol interval and outputting the delayed estimated value;
    a second delayer delaying an output signal of the first delayer by one symbol interval and outputting the delayed output signal;
    a subtraction unit subtracting the estimated value of the channel response in the previous symbol interval that is output from the second delayer from the estimated value of the channel response in the next symbol interval that is output from the channel estimator; and
    a divider dividing the subtraction result that is output from the subtraction unit by the estimated value of the channel response in the present symbol interval which is output from the first delayer and outputting the division result to the first multiplier as the first order fluctuating component of the channel response.

2. The ICI mitigating equalizer of claim 1, wherein the channel estimator estimates the channel response from one of the received signal in the frequency domain and a received signal in a time domain.

3. The ICI mitigating equalizer of claim 2, wherein the received signal in the frequency domain is obtained by transforming the received signal in the time domain through a fast Fourier transform (FFT) unit.

4. The ICI mitigating equalizer of claim 1, wherein the basic component of the channel response is a channel response component that is time-invariant for one symbol interval, and the fluctuating components of the channel response are channel response components that are time-variant for one symbol interval.

5. The ICI mitigating equalizer of claim 1, wherein in a case where a channel is approximated to an (M1)-th order model, the channel calculator outputs first order to (M1)-th order fluctuating components of the channel response to the ICI estimator.

6. The ICI mitigating equalizer of claim 1, wherein the ICI estimator comprises:
    a multiplication unit multiplying the fluctuating components of the channel response by the received signal in the frequency domain and outputting the multiplication results;
    a filter bank filtering the multiplication results according to the predetermined filter coefficients and outputting the filtering results; and
    an adder adding up the filtering results and outputting the ICI component.

7. The ICI mitigating equalizer of claim 6, wherein in a case where a channel is approximated to an (M1)-th order model, the multiplication unit comprises first to (M1)-th multipliers that respectively multiply first order to (M1)-th order fluctuating components of the channel response that are respectively output from the channel calculator by the received signal in the frequency domain to output the first to (M1)-th multiplication results.

8. The ICI mitigating equalizer of claim 6, wherein in a case where a channel is approximated to an (M1)-th order model, the filter bank comprises first to (M1)-th filters that respectively filter the first to (M1)-th multiplication results that are respectively output from the first to (M1)-th multipliers of the multiplication unit according to first to (M1)-th filter coefficients to output the first to (M1)-th filtering results.

9. The ICI mitigating equalizer of claim 8, wherein the first to (M1)-th filters are linear time-invariant filters.

10. The ICI mitigating equalizer of claim 9, wherein the first to (M1)-th filters are finite impulse response (FIR) filters.

11. The ICI mitigating equalizer of claim 10, wherein a number of filter taps of each of the first to (M1)-th filters is determined according to predetermined system requirements.

12. The ICI mitigating equalizer of claim 6, wherein in a case where a channel is approximated to an (M1)-th order model, the adder outputs the ICI component by adding up first to (M1)-th filtering results that are respectively output from first to (M1)-th filters of the filter bank.

13. The ICI mitigating equalizer of claim 1, wherein the equalizer is embodied as a one-tap equalizer.

14. The ICI mitigating equalizer of claim 1, which is applied to a receiver of an orthogonal frequency division multiplexing (OFDM) system.

15. A method of estimating inter-carrier interference (ICI), the method comprising:
  calculating first order to (M1)-th order fluctuating components of a channel response from a channel response that is estimated from a received signal;
  multiplying each of the first order to (M1)-th order fluctuating components of the channel response by the received signal in a frequency domain and outputting first to (M1)-th multiplication results;
  filtering the first to (M1)-th multiplication results respectively according to predetermined first to (M1)-th filter coefficients and outputting first to (M1)-th filtering results; and
  estimating an ICI component included in the received signal by adding up the first to (M1)-th filtering results, wherein the step of calculating comprises:
  delaying the estimated value of the channel response by one symbol interval and outputting the delayed estimated value;
  delaying an output signal of the first delayer by one symbol interval and outputting the delayed output signal;
  subtracting the estimated value of the channel response in the previous symbol interval from the estimated value of the channel response in the next symbol interval; and
  dividing the subtraction result by the estimated value of the channel response in the present symbol interval and outputting the division result as the first order fluctuating component of the channel response.

16. The method of claim 15, wherein in a case where a channel is approximated to an (M1)-th order model, the channel response that is estimated from the received signal is divided into a basic component that is time-invariant for one symbol interval and the first order to (M1)-th order fluctuating components that are time-variant for one symbol interval.

17. The method of claim 15, wherein the first to (M1)-th filtering results are output by (FIR)-filtering the first to (M1)-th multiplication results according to the predetermined first to (M1)-th filter coefficients, respectively.

18. An inter-carrier interference (ICI) mitigating equalizer comprising:
  a channel estimator estimating a channel response based on a received signal;
  a channel calculator calculating a basic component and a first order fluctuating component of a channel response based on the estimated channel response;
  a first multiplier multiplying the first order fluctuating component of the channel response by the received signal in a frequency domain and outputting a first multiplication result;
  a first filter FIR-filtering the first multiplication result according to predetermined first filter coefficients and outputting an ICI component included in the received signal;
  a subtracter subtracting the ICI component from the received signal in the frequency domain; and
  an equalizer equalizing an output signal of the subtracter according to the calculated basic component of the channel response, wherein the channel calculator comprises:
  a first delayer delaying the estimated value of the channel response that is output from the channel estimator by one symbol interval and outputting the delayed estimated value;
  a second delayer delaying an output signal of the first delayer by one symbol interval and outputting the delayed output signal;
  a subtraction unit subtracting the estimated value of the channel response in the previous symbol interval that is output from the second delayer from the estimated value of the channel response in the next symbol interval that is output from the channel estimator; and
  a divider dividing the subtraction result that is output from the subtraction unit by the estimated value of the channel response in the present symbol interval which is output from the first delayer and outputting the division result to the first multiplier as the first order fluctuating component of the channel response.

19. The ICI mitigating equalizer of claim 18, wherein the basic component of the channel response is a channel response component that is time-invariant for one symbol interval, and the first order fluctuating component of the channel response is a channel response component that is time-variant for one symbol interval.

20. The ICI mitigating equalizer of claim 18,
  wherein the channel estimator outputs an estimated value of a channel response in a previous symbol interval based on a sample value of a channel response at a center of an (i−1)-th symbol interval,
  wherein the channel estimator outputs an estimated value of a channel response in a present symbol interval based on a sample value of a channel response at a center of an i-th symbol interval, and
  wherein the channel estimator outputs an estimated value of a channel response in a next symbol interval based on a sample value of a channel response at a center of an (i+1)-th symbol interval.

21. The ICI mitigating equalizer of claim 20,
  wherein the channel calculator outputs the estimated value of the channel response in the present symbol interval as the basic component of the channel response, and
  wherein the channel calculator subtracts the estimated value of the channel response in the previous symbol interval from the estimated value of the channel response in the next symbol interval, divides the subtraction result by the estimated value of the channel response in the present symbol interval, and outputs the division result as the first order fluctuating component of the channel response.

22. The ICI mitigating equalizer of claim 18, wherein the channel calculator approximates a channel to a first order linear model.

23. The ICI mitigating equalizer of claim 18, wherein the equalizer divides the output signal of the subtraction unit by the basic component of the channel response that is output from the first delayer to output the division result.

24. The ICI mitigating equalizer of claim 23, wherein the equalizer is embodied as a one-tap equalizer.

* * * * *